Jan. 17, 1956  J. A. HERBST  2,731,627
THERMOCOUPLE MONITORING SYSTEM
Filed March 10, 1953  2 Sheets-Sheet 2

INVENTOR
John A. Herbst
BY
Philip G. Hilbert
ATTORNEY

United States Patent Office 2,731,627
Patented Jan. 17, 1956

2,731,627

THERMOCOUPLE MONITORING SYSTEM

John A. Herbst, Montville, N. J., assignor to Bogue Electric Manufacturing Co., Paterson, N. J., a corporation of New Jersey Application March 10, 1953, Serial No. 341,537

11 Claims. (Cl. 340—213)

This invention relates to monitoring systems for thermocouples.

Thermocouple systems for detecting excessive temperature conditions at a given point, such as a bearing in a rotating machine, and operating appropriate alarms, conventionally consist of a thermocouple junction at the given point and a cold reference junction which must be compensated by electrical means known in the art to provide a constant reference temperature. Such compensating means are quite sensitive and readily get out of order, thereby impairing the value of the thermocouple as an alarm actuating means.

Accordingly, an object of this invention is to provide a thermocouple for actuating an alarm which comprises a test thermocouple junction at the point to be monitored and a reference junction maintained at a temperature substantially higher than the normal operating temperatures to which the test junction is exposed, such reference junction being readily maintained at a constant temperature sufficiently elevated to avoid the danger of adversely affecting the resultant thermocouple output which operates an alarm.

Another object of this invention is to provide an alarm system for detecting excessive temperatures which includes a thermocouple system having an electrical output inversely related to the change in temperature at the test junction, together with amplifying means for amplifying the system output for supply to appropriate alarm means.

A further object of this invention is to provide an alarm system of the character described wherein failures in the amplifying means or the electrical components connecting the amplifying means and the alarm means will be detected and will operate the alarm means.

Still another object of this invention is to provide an improved alarm system including a plurality of thermocouples interconnected to individual visible alarm means and a common audible alarm means whereby excessive temperatures at any given thermocouple will be immediately indicated by its associated visible alarm and by the common audible alarm.

Still a further object of this invention is to provide an alarm system of the character described which includes circuit means for predetermining the normal operating temperatures at which individual alarms will operate, for taking temperature readings of any single thermocouple, for testing both the visible and audible alarms, and for detecting improper switching connections in the system.

Other objects of this invention will in part be obvious and in part hereinafter pointed out.

Figure 1:
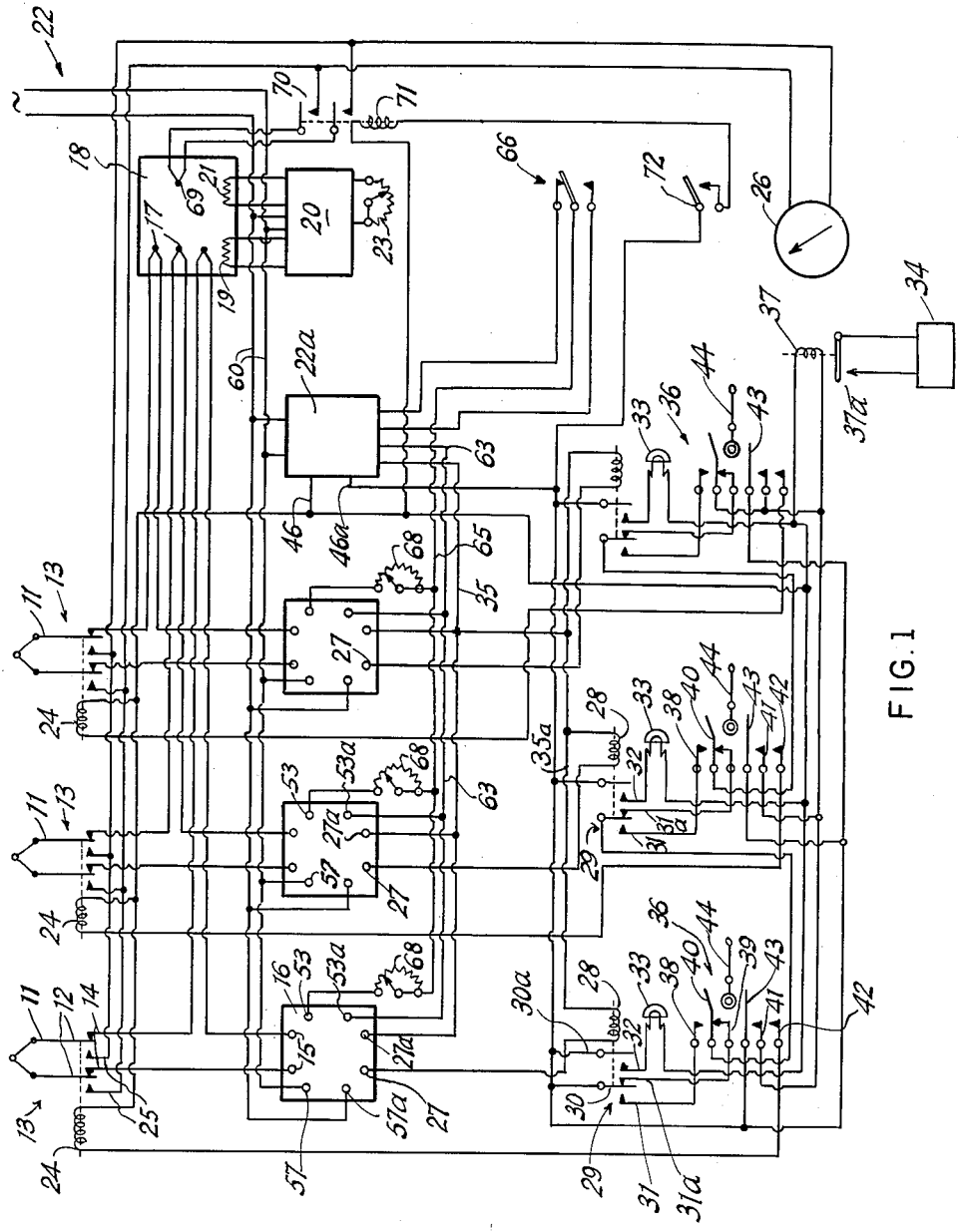
Fig. 1 is a circuit diagram of a monitoring system for thermocouples embodying the invention.

Referring in detail to the drawings, and particularly to Fig. 1, 10 indicates a thermocouple monitoring system embodying the invention. The same comprises a plurality of similar test thermocouple junctions 11, three being shown for the purpose of illustration, it being understood that any suitable number may be interconnected. Each test junction 11 is located at a point where excessive temperature conditions must be quickly detected, as for example at the individual bearings of an engine, and further, where the individual temperature of such a point may be measured at will.

Each test junction 11 is connected to the movable pair of contacts 12 of a switch 13, which contacts normally engage fixed contacts 14. One of each pair of contacts 14 is directly connected to one input terminal 15 of an amplifying device 16 associated with the concerned test junction 11. Such amplifying device may take the form of a two stage magnetic amplifier later described in detail. The other of each pair of contacts 14 is connected to one side of a reference junction 17 corresponding to a test junction 11, the other side of said reference junction being connected to the other input terminal 15 of the associated amplifier 16.

All of the reference junctions 17 are located within a well insulated receptacle 18, the interior of which is maintained at a constant, elevated temperature of approximately 100° F. higher than the normal operating temperatures at the points at which the test junctions 11 are located. A resistance heater 19 in receptacle 18 is adapted to be energized by way of an electrical control device 20 known in the art, for maintaining the reference junctions at the selected temperature. A detector resistance 21 in receptacle 18 measures the temperature in the receptacle and regulates the operation of the control device 20 in a manner known in the art.

The electrical input for device 20, heater 19, amplifiers 16 and relay circuits hereinafter described, is derived from an alternating current source indicated at 22. A rheostat 23 may be used to regulate the current supply to heater 19 and thereby set the constant working temperature of reference junctions 17.

Each switch 13 is actuated by a related relay coil 24. Each of the switches 13 includes a second pair of fixed contacts 25 which are connected in parallel relation and thence to a compensated cold junction thermocouple meter 26. When any one relay coil 24 is energized, in the manner hereinafter described, the switch 13 operated thereby connects the associated test junction 11 directly to meter 26 to give a temperature reading at the point at which said test junction is located.

The output of each amplifier 16 through its output terminals 27, 27a, is supplied to a corresponding relay coil 28 which controls the operation of an associated switch 29.

Each switch 29 comprises a pair of movable contacts 30, 30a, a pair of fixed contacts 31, 31a which are selectively engaged by contact 30, and a fixed contact 32 engageable by contact 30a. Each switch 29 controls the operation of a visible alarm in the form of an electric light 33, through its associated test junction 11, and furthermore, controls an audible type of electrically operated alarm 34 which will respond to the action of any one of the test junctions 11 upon exposure of the same to excessive temperatures, as more fully explained below.

One side of each relay coil 28 is directly connected to output terminal 27 of an associated amplifier 16. All the output terminals 27a of amplifiers 16 are interconnected by a common conductor 35 which in turn is connected to a common conductor 35a which interconnects the other side of the relay coils 28.

A three position switch 36 is interposed between each switch 29 and a relay coil 37 which operates the audible alarm 34 through a switch 37a. Each switch 36 comprises a pair of fixed contacts 38, 39 selectively engageable by a moveable contact 40; and a pair of contacts 41, 42 sequentially engageable by a movable contact 43. A pivoted switch actuating arm 44 is adapted to be disposed in an "on" position as shown in Fig. 1, wherein contact 39 is engaged by contact 40 while contacts 41, 42 are disengaged from each other and from contact 43.

The fixed contact 38 of each switch 36 is connected to contact 31 of switch 29 associated therewith. Contact 39 of each switch 36 is connected to contact 31a of switch 29 associated therewith. Contact 40 of the first switch 36 is connected to contact 30 of the second switch 29 in the series, the contact 40 of the second switch 36 in the series is connected to the contact 30 of the third switch 29 in the series and the contact 40 of the last switch 36 in the series is connected to one side of the alarm relay coil 37. The other side of relay coil 37 is connected by a conductor 45 to one terminal 46 of a power supply 22a connected to current source 22. The other terminal 46a of the power supply is connected to a conductor 47 which interconnects contacts 30a of switches 29, contact 30 of the first switch 29 in the series and contacts 43 of switches 36.

Each light 33 is connected on one side to contact 32 of associated switch 29, the other sides of said lights being interconnected by a common conductor which is connected to conductor 45. The switch contacts 41 are interconnected to each other and to the side of relay coil 37 which is connected to contact 40 of the last switch 36 in the series. One side of each relay coil 24 is connected to contact 42 of the switch 36 associated therewith, the other sides of said coils being interconnected by a common conductor which is connected to conductor 46.

With the switch actuating arm 44 of each switch 36 in the "on" position, as shown in Fig. 1, the system is in condition to detect excessive temperature conditions at any of the points at which test junctions 11 are located and to give both visible and audible alarms when such condition arises.

Thus, with the test junctions 11 exposed to normal operating conditions, the temperature differential between each test junction 11 and its corresponding reference junction 17 is such as to supply an electrical output for the associated amplifier 16 which will keep the associated relay coil 28 energized and the switch contacts 30, 30a in the position shown in Fig. 1. Accordingly, the relay coil 37 is kept energized leaving switch 37a open and alarm 34 inaudible. Furthermore, the circuits to lights 33 are open at contacts 30a, 32.

Should the temperature at any test junction 11 rise above normal, the temperature differential between said test junction and its corresponding reference junction 17 will decrease, and the resultant decrease in electrical output to the corresponding amplifier will cause a reduction in the energy supplied to the associated relay coil 28, thereby operating associated switch 29 to shift contacts 30, 30a to contacts 31, 32 respectively. The circuit to corresponding light 33 will be closed to give a visible alarm which directs attention to the particular test junction 11 and the circuit to relay coil 37 will be opened at contacts 30, 31a to deenergize the coil and to close the switch 37a, thereby sounding the audible alarm 34.

Figures 3, 4, 5:
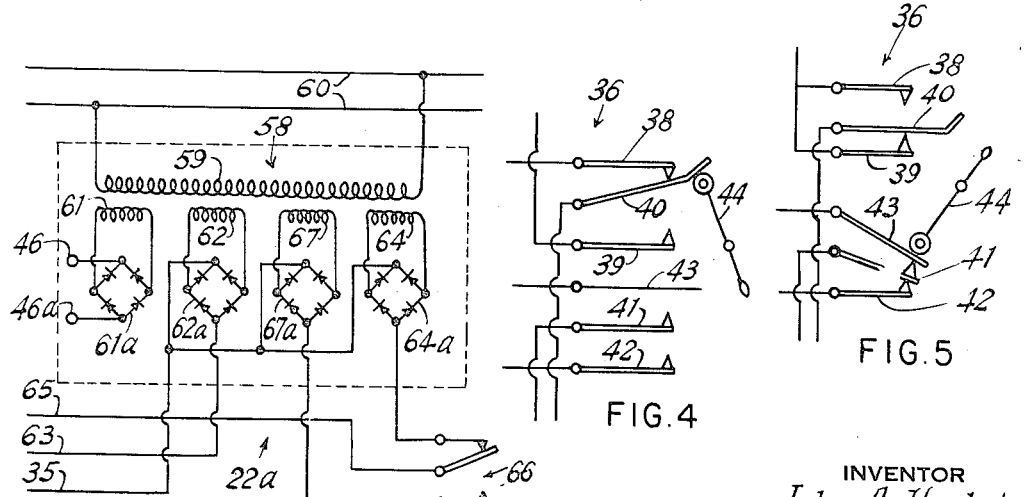
Fig. 3 is a detail circuit diagram of the power and bias current supply thereof.
Fig. 4 is a detail circuit diagram showing a switch in the system in its "off" position.
Fig. 5 is a diagram similar to that of Fig. 4, showing the switch in its "indicating" position.

When, as above, the alarm 34 sounds, the illuminated light 33 identifies the location at which excessive temperatures exist and the cause thereof may be investigated and remedied. At such time the switch actuating arm 44 of the corresponding switch 36 is moved to its "off" position, as shown in Fig. 4, thus shifting contact 40 from contact 39 to contact 38. This will reclose the circuit to the alarm relay coil 37, and will shut off alarm 34, but the light 33 will remain illuminated until such time as the cause of excessive temperature at the corresponding test junction 11 is corrected.

When the cause of excessive temperature at the test junction 11 is eliminated, the amplifier output will be restored to normal to reenergize coil 28 and to operate switch 29 to open the circuit to light 33. Also, the circuit at contacts 30, 31 will be opened which will deenergize coil 37 and operate the audible alarm 34 which calls attention to the fact that actuating arm 44 of switch 36 should be returned to its "on" position to restore the system to normal, at which time the alarm coil 37 will be reenergized to shut off the alarm 34.

When a temperature reading on meter 26 is to be taken in respect to a selected test junction 11, the switch 36 associated therewith has its arm 44 moved to its "Ind." position as shown in Fig. 5. Here, contacts 39, 40 remain in engaged relation while contact 43 first engages contact 41 which in turn engages contact 42. As a result, relay coil 24 is energized to shift contacts 12 to contacts 25, thus simultaneously disconnecting the test junction 11 from amplifier 16 and connecting said junction to meter 26 to give a temperature reading. While the reading is being taken, amplifier 16 has no output and the deenergized relay coil 28 would open the circuit at contacts 30, 31a to operate alarm 34, except that engaged contacts 41, 43 of switch 36 keep the relay coil 37 energized and thereby keep the alarm 34 inaudible. After taking the reading on meter 26, the switch arm 44 is restored to its "on" position, as in Fig. 1 and the system is again in its normal condition.

It is apparent, that if a switch 36 is in its "off" position while the cause of one alarm is being corrected, another test junction 11 may be operative to send in an alarm through its associated relay coil, 28 and switch 29. In addition, open circuits in the system, as in the amplifiers 16 or in relay coils 28 and 37 will be effective to deenergize coil 37 and to operate the audible alarm 34, thereby further insuring the operating efficiency of the system.

Figure 2:
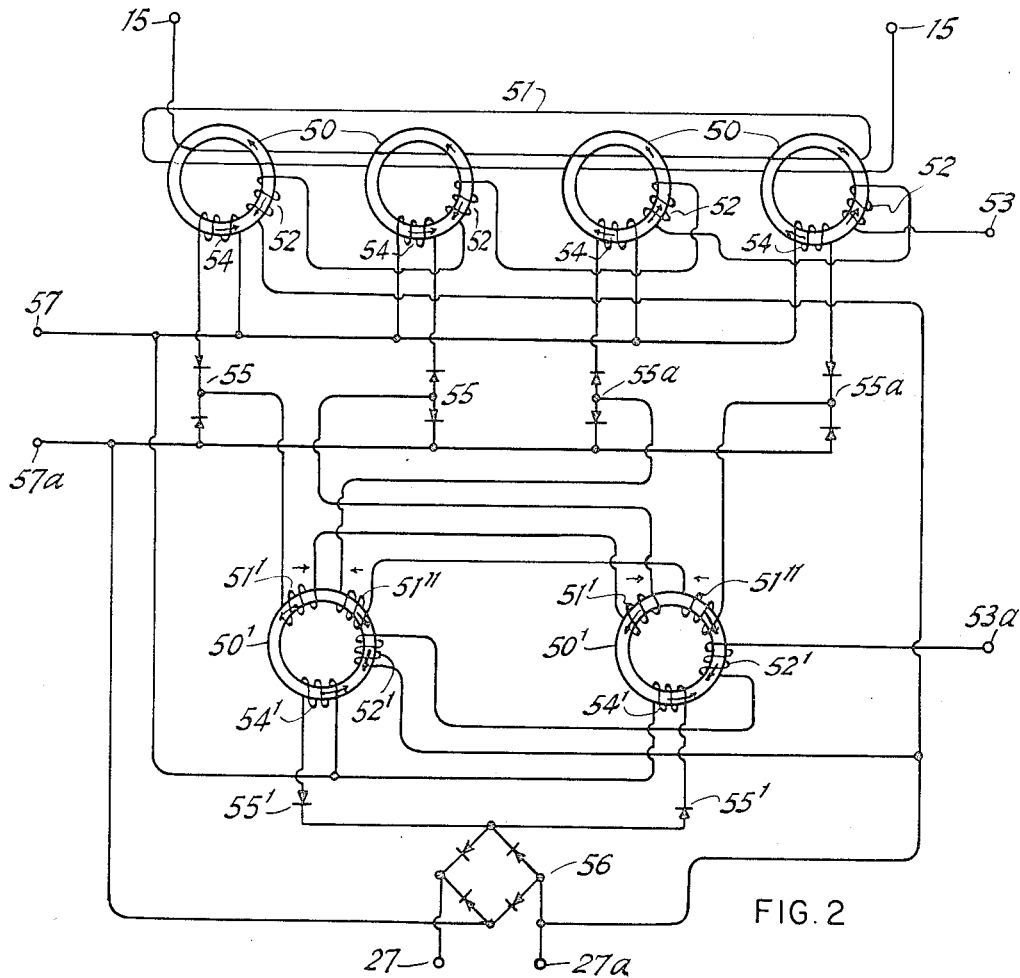
Fig. 2 is a detail circuit diagram of the amplifier components thereof.

Each amplifier 16 may take the form of a two stage magnetic amplifier, as shown in Fig. 2. The same comprises a first amplification stage including four similar reactors 50 having a common input winding 51 connected to input terminals 15, series connected bias windings 52 connected on one side to a bias input terminal 53, output windings 54 connected in parallel to each other and to power output terminals 57, 57a. The respective windings 54 have sets of rectifiers 55, 55a connected between one side thereof and terminal 57a.

The second stage of amplification comprises a pair of reactors 50' having series connected input windings 51' connected between the centertaps of rectifier sets 55 and series connected input windings 51" connected between the centertaps of rectifier sets 55a. The reactors 50' further include series connected bias windings 52' which are series connected with bias windings 52 of the first stage of amplification and the other bias input terminal 53a, and parallel connected output windings 54' with half wave rectifiers 55' inserted therein. A full wave bridge rectifier 56 has its input terminals connected between the juncture of rectifiers 55' and power input terminal 57a. The juncture of output windings 54' is connected to power input terminal 57.

The output terminals of rectifier 56 are connected to the amplifier output terminals 27, 27a; terminal 27a being also connected to the juncture of bias windings 52, 52'.

The power supply 22a, shown in detail in Fig. 3, includes a power transformer 58 with its primary winding 59 connected to the current source 22 by way of conductors 60 which are also connected to the power input terminals 57, 57a of each amplifier 16 and to the input of temperature control device 20. One transformer secondary winding 61 supplies power through full wave rectifier 61a to relay coils 24, lights 33 and to relay coil 37 through terminals 46, 46a. A second transformer winding 62 supplies power through full wave rectifier 62a to the bias windings of the second stage of amplification of each amplifier 16 by way of conductors 63, 35, see Fig. 1.

A third transformer secondary winding 64 supplies power through full wave rectifier 64a to the bias windings of the first stage of amplification of each amplifier 16 by way of conductors 65, 35, see Fig. 1. A single pole two way switch 66 is adapted to selectively connect the bias windings 52 of the first stage of amplification of all the amplifiers to the output of rectifier 64a or to the output of a fourth transformer secondary winding 67 through its full wave rectifier 67a.

The winding 67 is adapted to supply sufficient power to bias windings of all the amplifiers to simultaneously energize all the relay coils 28 and lights 33 to check the operability of said coils and lights. A rheostat 68 may be inserted between terminal 53 of each amplifier and conductor 65 to adjust the operating temperature at which alarm 34 will sound.

The temperature of the receptacle 18 may be visibly checked and read on meter 26 by means of a hot junction 69 located in the receptacle and connected to the meter by way of a switch 70 operable by a relay coil 71 in series circuit with a manually operable switch 72 and power output terminals 46, 46a.

It is apparent that there has been provided a system for monitoring a plurality of thermocouples wherein each thermocouple may actuate both visible and audible alarms; wherein the system is provided with safety features to detect wiring failures; which is immune to extraneous influences and which is otherwise well adapted to meet the conditions of practical use.

As various possible embodiments might be made of the above described invention and as various changes might be made in the embodiment herein set forth, it is to be understood that all matter herein set forth or shown in the accompanying drawings is to be interpreted as illustrative and not in a limiting sense.

Having thus described my invention, I claim as new and desire to protect by Letters Patent:

1. In combination, a plurality of thermocouples each thermocouple comprising a test junction and a reference junction in circuit therewith, means for maintaining said reference junctions at a constant elevated temperature higher than the temperature to which the test junctions are exposed, said interconnected junctions providing an electrical output inversely related to changes in temperature at said test junctions, an electrically operated audible alarm means, a circuit controlling the operation of said alarm means, switch means associated with each thermocouple for controlling said circuit, and means operative in response to a decrease in electrical output of each thermocouple for actuating the switch means associated therewith.

2. The combination as in claim 1 and further including electrically operated, visible alarm means in circuit with each of said switch means and operable upon actuation of said switch means.

3. In combination, a plurality of thermocouples, each thermocouple comprising a test junction and a reference junction in circuit therewith to provide an electrical output, means for maintaining said reference junctions at a constant elevated temperature higher than the temperature to which said test junctions are to be exposed, magnetic amplifying means associated with each thermocouple, each amplifying means comprising an input circuit, an output circuit and a bias circuit, said input circuit being connected with the output of the thermocouple associated therewith, and means for varying the input to the bias circuit of each amplifying means to control the output of the output circuit thereof in relation to the output of the thermocouple associated therewith.

4. In combination, a plurality of thermocouples, each thermocouple comprising a test junction and a reference junction, receptacle means for containing the reference junctions of all of said thermocouples, means for maintaining said receptacle means at a constant elevated temperature higher than the temperature to which said test junctions are to be exposed, a circuit including alarm means in normally energized condition for rendering said alarm means inoperative, amplifying means in circuit with each thermocouple and having an output inversely proportional to the temperature changes at the test junction of the thermocouple associated therewith, a control circuit between each of said amplifying means and said alarm circuit responsive to a predetermined output from said amplifying means for maintaining said alarm circuit in energized condition, said control circuits being operative in response to a reduced output from the amplifying means associated therewith to open said alarm circuit and thereby actuate said alarm means.

5. The combination as in claim 4, wherein each control circuit comprises a switch connected in said alarm circuit and a relay for operating said switch, said relay being connected to the output of the amplifying means associated therewith, and an electrically operated visible alarm means associated with each thermocouple, each of said last mentioned means being controlled by the control circuit associated therewith.

6. The combination as in claim 4 and further including a circuit comprising a cold junction thermocouple meter, and switch means associated with each of said thermocouples operable to maintain said alarm circuit in an energized condition while disconnecting the test junction of the thermocouple associated therewith from the amplifying means associated therewith and reconnecting said hot junction to said meter circuit.

7. The combination as in claim 5 and further including switch means associated with each of said thermocouples, said switch means being serially connected to each other through the switches of the successive control circuits, each switch means being operable to maintain said alarm circuit in an energized condition while the output of the amplifying means associated therewith is of a value less than said predetermined output and simultaneously maintaining said visible alarm means associated therewith in an operative conditions.

8. In combination, a thermocouple comprising a test junction and a reference junction in circuit therewith, and means for maintaining said reference junction at a constant temperature higher than the temperature to which the test junction is to be exposed, said interconnected junctions providing a decreased electrical output in response to an increase in temperature at said test junction.

9. In combination, a thermocouple comprising a test junction and a reference junction in circuit therewith, means for maintaining said reference junction at a constant temperature higher than the temperature to which the test junction is exposed, said interconnected junctions providing an electrical output inversely related to changes in temperature at said test junction, and electrical alarm means operable by said electrical output, said alarm means including a normally energized circuit for maintaining said alarm means in an inoperative condition and means responsive to the decrease in electrical output for opening said energized circuit to operate said alarm means.

10. In combination, a thermocouple comprising a test junction and a reference junction in circuit therewith, means for maintaining said reference junction at a constant temperature higher than the temperature to which the test junction is exposed, said interconnected junctions providing an electrical output inversely related to changes of temperature at said test junction, amplifying means having an input in circuit with said electrical output, a normally energized alarm operating circuit, and switch means in said last mentioned circuit operable by the output of said amplifying means, said amplifying means being responsive to a decrease in said electrical output to open said switch means.

11. In combination, circuit means operative in response to a predetermined electrical input applied thereto, a thermocouple comprising a test junction and a reference junction in circuit therewith, means for maintaining said reference junction at a constant elevated temperature higher than the temperature to which the test junction is exposed, said interconnected junctions providing an electrical output normally of a value equal to at least that of said predetermined electrical input and responsive to an increase in temperature at said test junction to provide an electrical output of a value less than that of said predetermined electrical input, and circuit means connecting said interconnected junctions and said first mentioned circuit means.

References Cited in the file of this patent

UNITED STATES PATENTS

| | | |
|---|---|---|
| 2,000,074 | Grant, Jr. | May 7, 1935 |
| 2,262,650 | Regan et al. | Nov. 11, 1941 |
| 2,428,568 | Hill | Oct. 7, 1947 |
| 2,440,002 | Bower | Apr. 20, 1948 |
| 2,473,940 | Clark | June 21, 1949 |
| 2,493,548 | Proctor | Jan. 3, 1950 |
| 2,501,793 | Sperry | Mar. 28, 1950 |
| 2,560,829 | Stewart | July 17, 1951 |
| 2,576,892 | Stanton | Nov. 27, 1951 |
| 2,578,447 | Odell et al. | Dec. 11, 1951 |
| 2,678,433 | Evans | May 11, 1954 |
| 2,679,036 | Vasek | May 18, 1954 |
| 2,695,400 | Smitzer | Nov. 23, 1954 |